US012570276B2

(12) United States Patent (10) Patent No.: US 12,570,276 B2
Gierzynski et al. (45) Date of Patent: Mar. 10, 2026

(54) ERRATIC DRIVER DETECTION

(71) Applicant: Robert Bosch GmbH, Stuttgart (DE)

(72) Inventors: Colin James Gierzynski, Livonia, MI (US); Kazuki Shiozawa, Novi, MI (US); Kevin Edward Buckner, Ann Arbor, MI (US); Mohammed Nurul Anwar Mamun, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 17/823,219

(22) Filed: Aug. 30, 2022

(65) Prior Publication Data

US 2024/0067164 A1 Feb. 29, 2024

(51) Int. Cl.
*B60W 30/09* (2012.01)
*B60W 30/18* (2012.01)
*B60W 50/14* (2020.01)
*G08G 1/01* (2006.01)
*G08G 1/0967* (2006.01)

(52) U.S. Cl.
CPC ...... *B60W 30/09* (2013.01); *B60W 30/18163* (2013.01); *B60W 50/14* (2013.01); *G08G 1/0104* (2013.01); *G08G 1/096725* (2013.01); *B60W 2540/30* (2013.01); *B60W 2552/53* (2020.02); *B60W 2554/4041* (2020.02); *B60W 2554/4046* (2020.02); *B60W 2554/80* (2020.02);

(Continued)

(58) Field of Classification Search
None
See application file for complete search history.

(56) References Cited

U.S. PATENT DOCUMENTS 7,418,346 B2 8/2008 Breed et al.
9,771,070 B2 9/2017 Zagorski et al.
(Continued)

OTHER PUBLICATIONS

Ren, Yuan-Yuan, et al., "A Method for Predicting Diverse Lane-Changing Trajectories of Surrounding Vehicles Based on Early Detection of Lane Change", Feb. 7, 2022, IEEE (Year: 2022).*

(Continued)

*Primary Examiner* — Navid Z. Mehdizadeh
*Assistant Examiner* — Sarah A. Mueller
(74) *Attorney, Agent, or Firm* — Michael Best & Friedrich LLP

(57) ABSTRACT

An erratic driver detection system for a host vehicle. The system includes a sensor configured to measure a distance between the host vehicle and a detected neighboring vehicle, and output sensor data. The system also includes an electronic processor connected to the sensor and configured to build an expected driving behavior model and a target driving behavior model corresponding to the detected neighboring vehicle based on the sensor data. The target driving behavior model includes past, present, and predicted trajectories of the detected neighboring vehicle. The electronic processor is also configured to determine a difference between the target driving behavior model and the expected driving behavior model, identify an instance of erratic driving with respect to the detected neighboring vehicle based on the difference. In response to identifying the instance of erratic driving, the electronic processor controls the vehicle to perform a safety action.

15 Claims, 5 Drawing Sheets

(52) U.S. Cl.
CPC ... *B60W 2710/18* (2013.01); *B60W 2720/106* (2013.01)

(56) References Cited

U.S. PATENT DOCUMENTS

| | | | |
|---|---|---|---|
| 10,318,828 B2* | 6/2019 | Hampiholi | ............. G08G 1/205 |
| 10,996,073 B2 | 5/2021 | Tang | |
| 11,100,801 B2 | 8/2021 | Pipe et al. | |
| 11,267,313 B2 | 3/2022 | Chundrlik, Jr. et al. | |
| 2016/0347309 A1* | 12/2016 | Vijayan | .................. G08G 1/166 |
| 2021/0094558 A1 | 4/2021 | Garcia et al. | |
| 2021/0179092 A1* | 6/2021 | Chen | ..................... B60W 10/04 |
| 2022/0281445 A1* | 9/2022 | Schöning | ........ B60W 60/00276 |
| 2024/0174230 A1* | 5/2024 | Saito | ..................... B60W 30/16 |

OTHER PUBLICATIONS

Azadani, Mozhgan Nasr, et al., "Driving Behavior Analysis Guidelines for Intelligent Transport Systems", May 13, 2021, IEEE (Year: 2021).*

* cited by examiner

*10*

*18*

ERRATIC DRIVER DETECTION

BACKGROUND

Modern vehicles include what are often referred to as advanced driver assistance systems (ADAS), for example, lane keeping assistance, adaptive cruise-control, collision mitigation, self-parking, and others.

SUMMARY

One example provides an erratic driver detection system for a host vehicle, the system comprising: a sensor configured to measure a distance between the host vehicle and a detected neighboring vehicle, and output sensor data; an electronic processor connected to the sensor and configured to build an expected driving behavior model corresponding to expected neighboring vehicle driving behavior, build a target driving behavior model corresponding to the detected neighboring vehicle based on the sensor data, the target driving behavior model including past, present, and predicted trajectories of the detected neighboring vehicle, determine a difference between the target driving behavior model and the expected driving behavior model, identify an instance of erratic driving with respect to the detected neighboring vehicle when the difference between the target driving behavior model and the expected driving behavior model is greater than a threshold difference, in response to identifying the instance of erratic driving, control the vehicle to perform a safety action.

In some instances, the electronic processor is further configured to sample the expected driving behavior model and the target driving behavior model at discrete points, determine the differences between the sampled values at each discrete point, and determine the difference between the target driving behavior model and the expected driving behavior model based on the differences in sampled values.

In some instances, the detected neighboring vehicle is a first neighboring vehicle, the target driving behavior model is a first target driving behavior model, the sensor is configured to measure the distance between the host vehicle and a second neighboring vehicle in front of or behind the first neighboring vehicle, the electronic processor is further configured to build a second target driving behavior model corresponding to the second neighboring vehicle based on the sensor data, and include the first target driving behavior model in the expected driving behavior model.

In some instances, the sensor is further configured to detect lane markings on the roadway, and the electronic processor is further configured to the build a plurality of expected driving behavior models based on the detected lane markings.

In some instances, the threshold difference is a second threshold difference, and the electronic processor is further configured to identify an instance of abnormal driving with respect to the detected neighboring vehicle when the difference between the target driving behavior model and the expected driving behavior model is greater than a first threshold difference, the first threshold difference being less than the second threshold difference.

In some instances, the electronic processor is further configured to classify the instance of abnormal driving as erratic driving in response to determining that the detected neighboring vehicle has exhibited at least a predetermined number of instances of abnormal driving.

In some instances, the system further comprises a user interface, wherein the safety action includes providing an indication to the user interface.

In some instances, the safety action includes at least one selected from the group consisting of shortening driver hands-off time, shifting the host vehicle from the center of the lane, or pre-filling the host vehicle brakes.

In some instances, the safety action includes at least one of controlling the host vehicle to brake, controlling the host vehicle to accelerate, or controlling the host vehicle to change lanes.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate aspects, features and instances of the claimed subject matter, and explain various principles and advantages of those aspects, features, instances.

Figure 1:
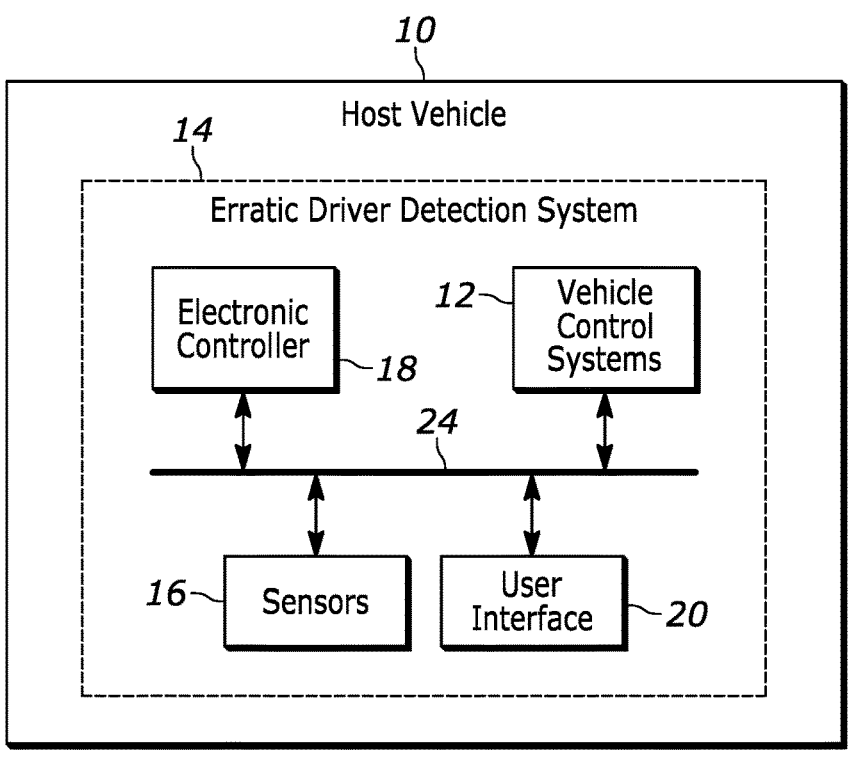
FIG. 1 schematically illustrates a host vehicle in which an erratic driver detection system is implemented, according to some aspects.

The apparatus and method components have been represented where appropriate by conventional symbols in the drawings, showing only those specific details that are pertinent to understanding the aspects, features, and instances so as not to obscure the disclosure with details that will be readily apparent to those of ordinary skill in the art having the benefit of the description herein.

DETAILED DESCRIPTION

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Erratic driving may be the result of distracted driving, drunk driving, or fatigued driving, and may result in a collision. It may be difficult or impossible for drivers in neighboring vehicles to assess whether any particular vehicle in a traffic flow is driven erratically. Systems and methods described herein provide, among other things, techniques for determining erratic driving in a vehicle neighboring an ego or host vehicle. In some cases, the erratic driving detection system uses vehicle sensors such as cameras, LIDAR, and ultrasonic sensors. These sensors may be included in or be a part of pre-existing advanced driver assistance systems. Information provided by these sensors is provided to a vehicle controller. The vehicle controller uses this information to determine an erratic driving situation and controls the host vehicle to take action to help avoid a collision.

FIG. 1 schematically illustrates a host vehicle 10 in which an erratic driver detection system 14 is situated. In some instances, the host vehicle 10 is an autonomous vehicle. The term "autonomous vehicle" is used in an inclusive way to refer to an autonomous or partially autonomous vehicle, which possesses varying degrees of automation (that is, the vehicle is configured to drive itself with limited, or in some cases no, input from a driver). The term "driver," as used herein, generally refers to an occupant of a vehicle, who operates the controls of the vehicle or provides control input to the vehicle to influence the operation of the vehicle.

In the illustrated example, the host vehicle 10 may include an electronic controller 18, vehicle control systems 22, a plurality of sensors 16, and a user interface 20. The components of the host vehicle 10, along with other various modules and components are electrically and communicatively coupled to each other via direct connections or by or through one or more control or data buses (for example, the bus 24), which enable communication therebetween. The erratic driver detection system 14 relies on the various modules and components of the host vehicle 10. The use of control and data buses for the interconnection between, and communication among, the various modules and components would be known to a person skilled in the art in view of the invention described herein. In some instances, the bus 24 is a Controller Area Network (CAN™) bus. In some instances, the bus 24 is an automotive Ethernet™, a FlexRay™ communications bus, or another suitable bus. In alternative instances, some or all of the components of the host vehicle 10 may be communicatively coupled using suitable wireless modalities (for example, Bluetooth™ or near field communication connections).

The electronic controller 18 (described more particularly below with respect to FIG. 2) communicates with vehicle control systems 22 and the sensors 16. The electronic controller 18 may receive sensor data from the sensors 16 and determine control commands for the host vehicle 10. The electronic controller 18 transmits the control commands to, among other things, the vehicle control systems 22 to operate or assist in operating the host vehicle 10 (for example, by generating braking signals, acceleration signals, steering signals). In some instances, the electronic controller 18 is part of one or more vehicle controllers that implement partially autonomous control of the host vehicle 10.

The vehicle control systems 22 may include controllers, sensors, actuators, and the like for controlling aspects of the operation of the host vehicle 10 (for example, acceleration, braking, shifting gears, and the like). The vehicle control systems 22 communicate with the electronic controller 18 via the bus 24.

The sensors 16 determine one or more attributes of the host vehicle 10 and its surrounding environment and communicate information regarding those attributes to the other components of the host vehicle 10 using, for example, messages transmitted on the bus 24. The sensors 16 may include, for example, vehicle control sensors (for example, sensors that detect accelerator pedal position and brake pedal position, wheel speed sensors, vehicle speed sensors, yaw, pitch, and roll sensors, force sensors, and vehicle proximity sensors (for example, ultrasonic). In some instances, the sensors 16 include one or more cameras or other imaging devices configured to capture one or more images of the environment surrounding the host vehicle 10. Radar and lidar sensors may also be used. The erratic driver detection system 14 may include other sensors for implementing the method 60. The erratic driver detection system 14 may include some or all of the sensors 16 included in the host vehicle 10.

In some instances, the electronic controller 18 controls aspects of the operation of the host vehicle 10 based on commands received from the user interface 20. The user interface 20 provides an interface between the components of the host vehicle 10 and an occupant (for example, a driver) of the host vehicle 10. The user interface 20 is configured to receive input from the driver, receive indications of vehicle status from the system's controllers (for example, the electronic controller 18), and provide information to the driver based on the received indications. The user interface 20 provides visual output, such as, for example, graphical indicators (for example, fixed or animated icons), lights, colors, text, images, combinations of the foregoing, and the like. The user interface 20 includes a suitable display mechanism for displaying the visual output, such as, for example, a liquid crystal display (LCD) touch screen, or an organic light-emitting diode (OLED) touch screen), or other suitable mechanisms. In some instances, the user interface 20 displays a graphical user interface (GUI) (for example, generated by the electronic controller 18 and presented on a display screen) that enables a driver or passenger to interact with the host vehicle 10. The user interface 20 may also provide audio output to the driver via a chime, buzzer, speaker, or other suitable device included in the user interface 20 or separate from the user interface 20. In some instances, user interface 20 provides haptic outputs to the driver by vibrating one or more vehicle components (for example, the vehicle's steering wheel and the seats), for example, using a vibration motor. In some instances, user interface 20 provides a combination of visual, audio, and haptic outputs.

Figure 2:
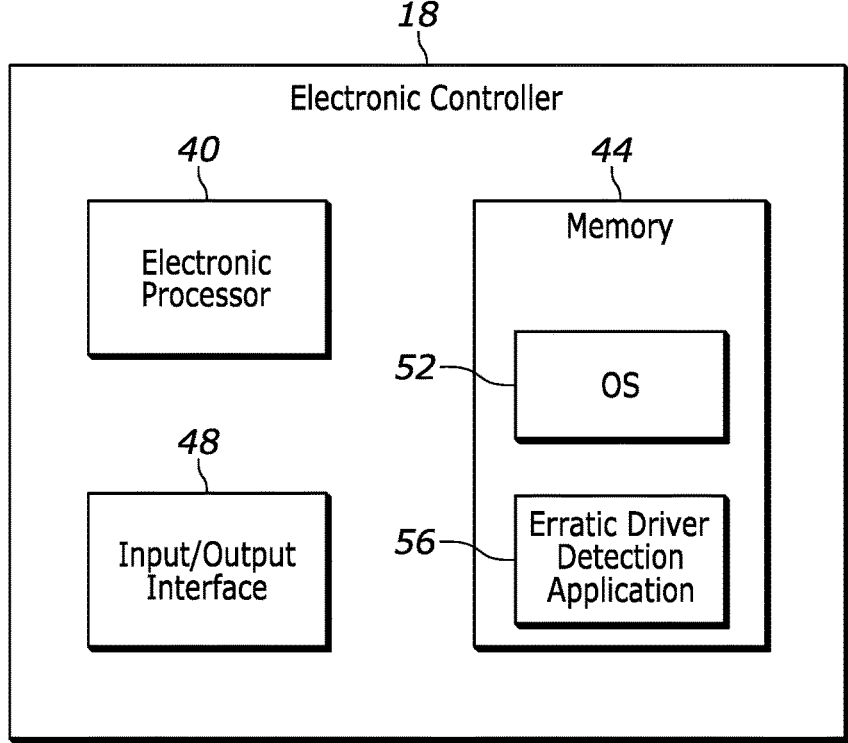
FIG. 2 schematically illustrates an electronic controller included in the host vehicle of FIG. 1, according to some aspects.

FIG. 2 illustrates an example of the electronic controller 18, which includes an electronic processor 40 (for example, a microprocessor, application specific integrated circuit, etc.), a memory 44, and an input/output interface 48. The memory 44 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 40 is coupled to the memory 44 and the input/output interface 48. The electronic processor 40 sends and receives information (for example, from the memory 44 and/or the input/output interface 48) and processes the information by executing one or more software instructions or modules, capable of being stored in the memory 44, or another non-transitory computer readable medium. The software can include firmware, one or more applications, program data, filters, rules, one or more program modules, and other executable instructions. The electronic processor 40 is configured to retrieve from the memory 44 and execute, among other things, software for performing methods as described herein. In the example illustrated, the memory 44 stores, among other things, a vehicle operating system 52 and an erratic driver detection application 56 for implementing the erratic driver detection system 14. The input/output interface 48 transmits and receives information from devices external to the electronic controller 18 (for example, components of the host vehicle 10 via the bus 24).

Figure 3:
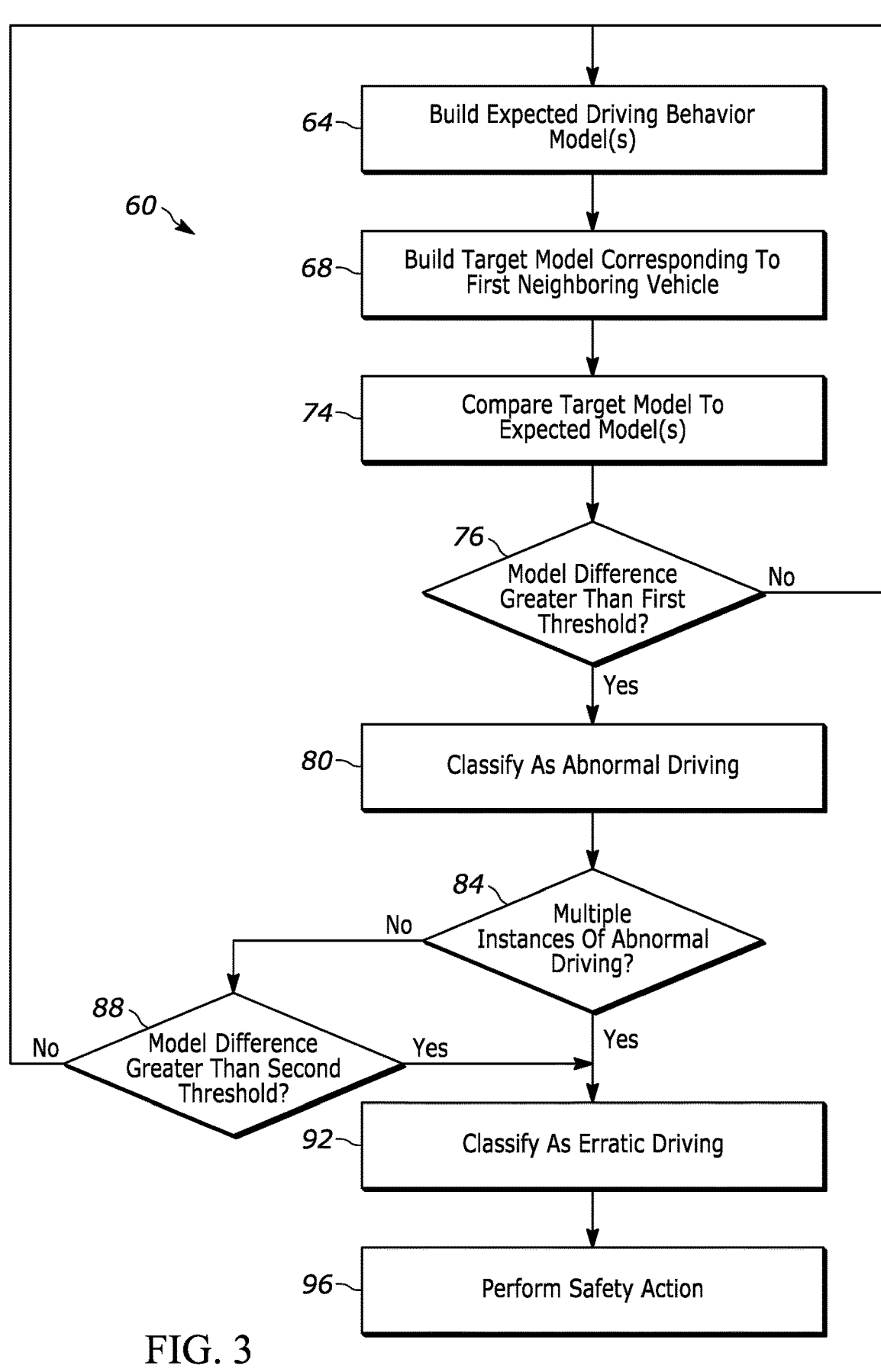
FIG. 3 illustrates an erratic driver detection method, according to some aspects.

FIG. 3 is a flowchart illustrating an example method 60 of an erratic driver detection application 56 that can be implemented in a host vehicle 10. As the host vehicle 10 travels on a roadway, the sensors 16 repeatedly measure the location of other vehicles relative to the host vehicle 10, and provide sensor data to the electronic processor. For example, the sensors 16 may measure a distance between the host vehicle 10 and the other vehicles. In some instances, the sensors 16 are also configured to detect lane markings on the roadway. At step 64, the electronic processor 40 builds one or more expected driving behavior models based on the sensor data or information. For example, based on the detected lane markings, the electronic processor 40 may build one or more expected driving behavior models corresponding to the expected driving behavior of a car driving in the center of an adjacent lane. Because not all vehicles travel in the center of the lane, the electronic processor 40 may build multiple models of expected driving behavior corresponding to various distances from the center of the lane.

Figure 4:
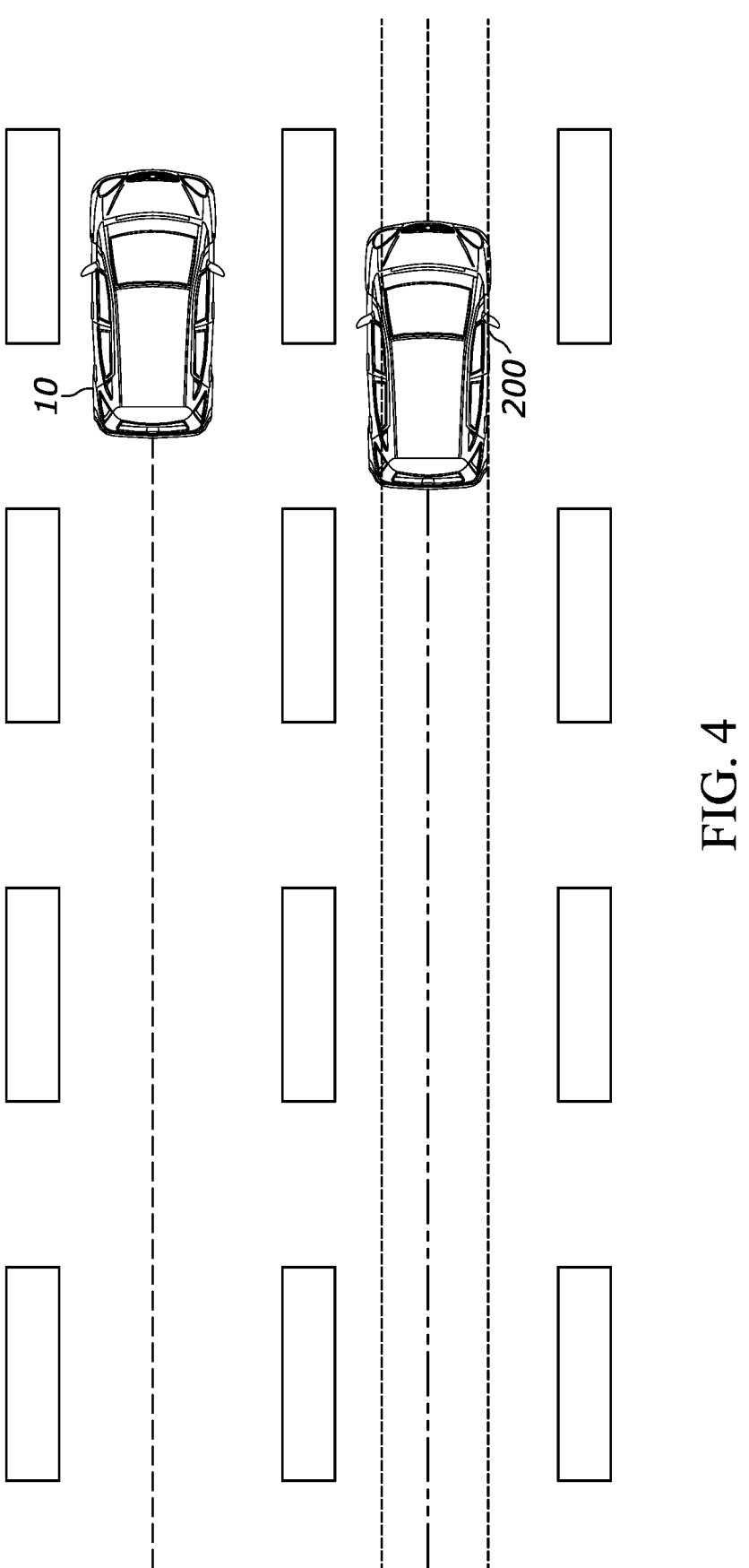
FIG. 4 illustrates an example driving scenario, according to some aspects.

At step 68, the electronic processor 40 detects a first neighboring vehicle 200 in an adjacent lane (see FIGS. 4-6) and builds a target driving behavior model corresponding to the detected first neighboring vehicle 200 detected on the roadway based on the received sensor data. The target driving behavior model is a driving behavior model which is analyzed by the electronic processor 40 to determine whether the detected first neighboring vehicle 200 is driving erratically. Based on the sensor data, the electronic processor 40 determines past, present, and predicted trajectories of the neighboring vehicle, and includes these trajectories in the target model. In one example, the model includes the path over a period of time that the first neighboring vehicle 200 has taken or is expected to take. As the host vehicle 10 travels on the roadway, the model is repeatedly updated by the electronic processor 40 based on new sensor information. Referring to FIG. 4, for example, the electronic processor 40 may detect that a first neighboring vehicle 200 is adjacent to the host vehicle 10, and build a target model corresponding to the first neighboring vehicle 200.

At step 74, the electronic processor 40 compares the target driving behavior model to the expected driving behavior model or models. The electronic processor 40 may sample the target driving behavior model and one or more of the expected driving behavior models at discrete points, and determine the difference between the sampled values at those points. The electronic processor 40 then determines the difference between the target model and the one or more expected driving behavior models based on the total difference between the sampled values at each discrete point. For example, the electronic processor 40 may determine the lateral distance between (points of) the expected model and (points of) the target model when sampled at the same longitudinal point in the roadway.

In some instances, electronic processor 40 identifies the particular expected driving behavior model most closely corresponding to the target driving behavior model, and performs a comparison between the target driving behavior model and the closest matching expected driving behavior model. For example, the target driving behavior model may most closely correspond to an expected driving behavior model that traverses through the center of the lane. Alternatively, the target driving behavior model may most closely correspond to an expected driving behavior model that traverses off-center from the lane. In some instances, the target driving behavior model most closely corresponds with an expected model that corresponds to another vehicle detected in the same lane as the first neighboring vehicle 200.

Figure 5:
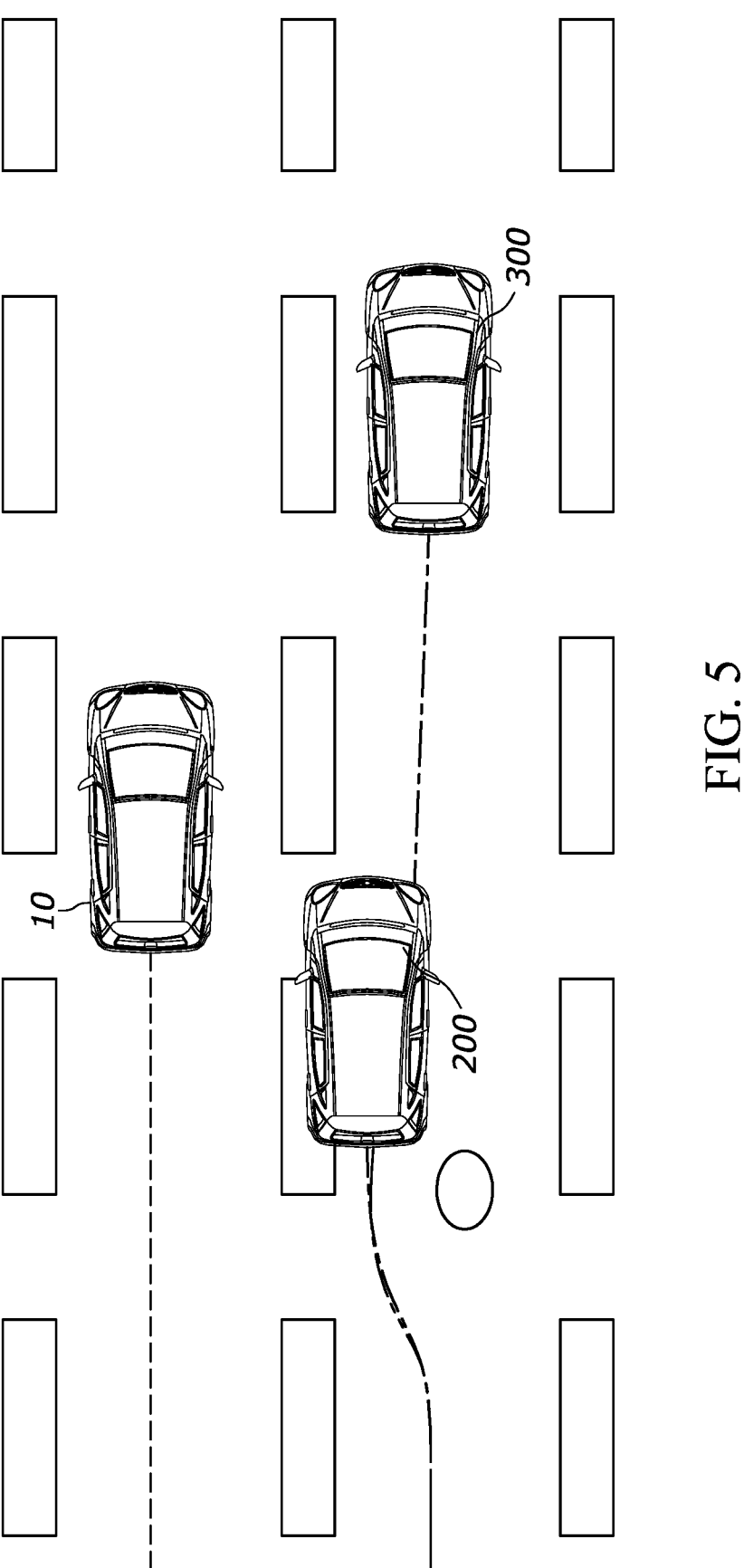
FIG. 5 illustrates an obstacle avoidance scenario, according to some aspects.

Referring to FIG. 5, in one example, the target driving behavior model is a first target driving behavior model. The electronic processor may build a second target driving behavior model corresponding to a second neighboring vehicle 300, and include the second target driving behavior model in the one or more expected driving behavior models. In some instances, the second neighboring vehicle 300 is a vehicle in front of or behind the first neighboring vehicle 200. The electronic processor 40 may then determine the difference between the first target driving behavior model corresponding to the first neighboring vehicle 200 and the second target driving behavior model corresponding to the second neighboring vehicle 300.

At step 76, the electronic processor 40 determines whether the difference between the target model and the expected model is greater than a first threshold difference.

The first threshold difference may be a value predefined by the erratic driver detection system 14, a user-selectable value, or a value based on the lane markings of the roadway. In some instances, the first threshold difference is based in part on the longitudinal distance between the host vehicle 10 and the first neighboring vehicle 200. For example, when the first neighboring vehicle 200 is located at a longitudinal distance sufficiently far from the host vehicle 10, the first difference threshold may be greater than situations where the first neighboring vehicle 200 is immediately adjacent the host vehicle 10.

When the electronic processor 40 determines that the difference between the target model and the expected model is less than or equal to a first threshold difference, the method 60 proceeds to step 64, and the electronic processor 40 continues building expected driving behavior models. Referring again to FIG. 5, in one example the electronic processor 40 determines that there is not a significant difference (e.g., the difference is less than the first threshold difference) between the target driving model corresponding to the first neighboring vehicle 200 and the driving behavior model corresponding to the second neighboring vehicle 300. Including the models corresponding to other vehicles in the roadway in the plurality of expected driving behavior models helps the electronic processor 40 to avoid erroneously flagging a vehicle as driving erratically in cases of obstacle avoidance.

In contrast, when the electronic processor 40 determines that the difference between the target model and the expected model is greater than the first threshold difference, the electronic processor 40 sets an abnormal driving flag corresponding to the target neighboring vehicle or otherwise logs the instance of abnormal driving in memory 44. The electronic processor 40 may store in memory 44 information corresponding to the instance of abnormal driving, such as a target neighboring vehicle identifier, a geographic location of the instance, a time of the instance, or other information included in the model of the target neighboring vehicle.

After flagging the first neighboring vehicle 200 as driving abnormally at step 80, the method 60 proceeds to step 84. At step 84, the electronic processor 40 determines whether the target neighboring vehicle has exhibited multiple instances of abnormal driving behavior. When the electronic processor 40 has logged a predetermined number of instances of abnormal driving corresponding to the first neighboring vehicle 200, the electronic processor 40 may proceed to step 92 and classify the current instance of abnormal driving as an instance of erratic driving. For example, when the electronic processor 40 determines that the first neighboring vehicle 200 has swerved in the roadway three times, the electronic processor 40 may classify the vehicle as driving erratically. The number of logged instances of abnormal driving required to be classified as an instance erratic driving is not limited to three, and may be less than three or more than three. In some instances, the number of instances of abnormal driving required in order to be classified as an instance of erratic driving is dependent on a time frame of the logged instances of abnormal driving. For example, when the electronic processor 40 determines, based on the model comparison, that the first neighboring vehicle 200 has swerved three times in the span of ten minutes, the electronic processor 40 may classify the abnormal driving instance as an instance of erratic driving. In contrast, when the electronic processor 40 determines that the first neighboring vehicle 200 has swerved three times in the span of four hours, the electronic processor 40 may not classify the abnormal driving instance as an instance of erratic driving.

Figure 6:
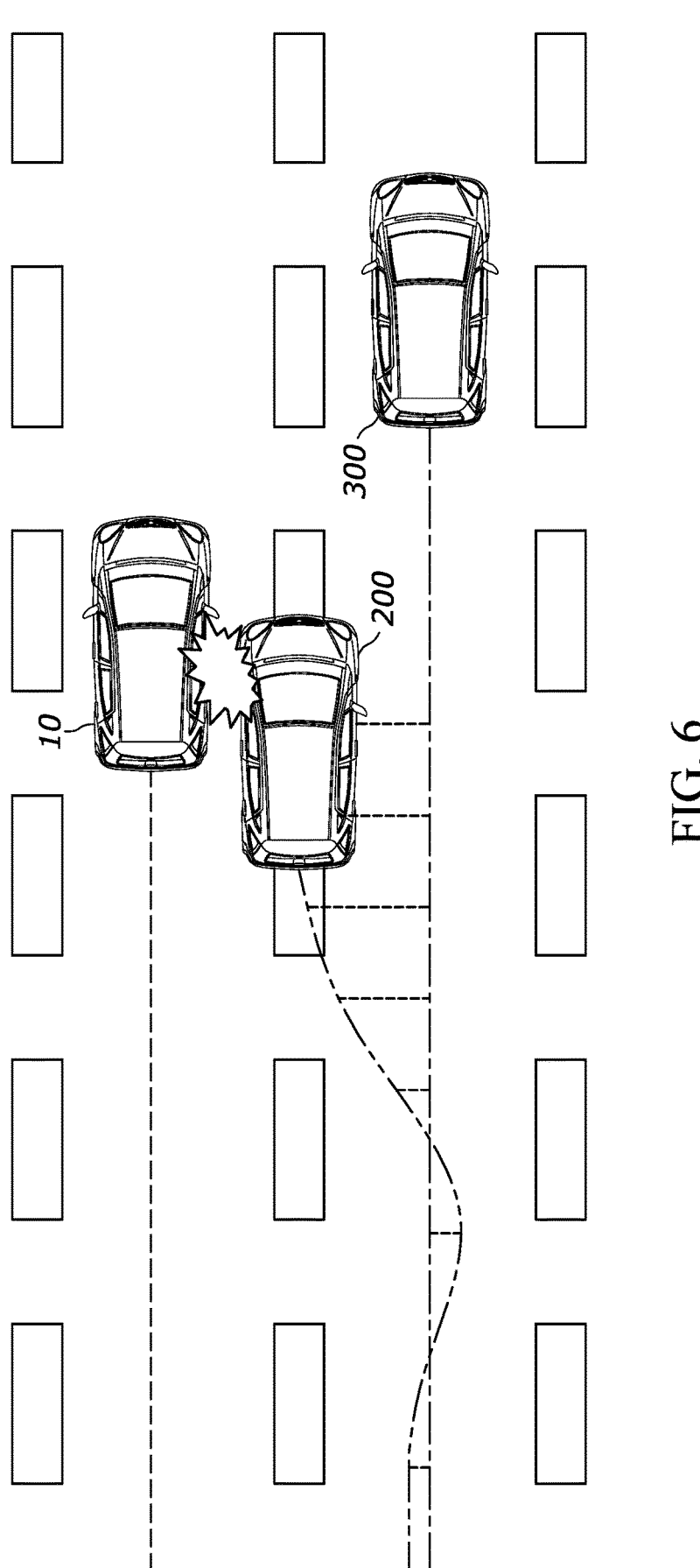
FIG. 6 illustrates an erratic driving scenario, according to some aspects.

If at step 84, the electronic processor 40 determines that the first neighboring vehicle 200 has not had a predetermined number of abnormal driving instances, the method 60 proceeds to step 88. At step 88, the electronic processor 40 determines, based on the comparison of the target model and the expected model performed in step 74, whether the difference between the target model and the expected model is greater than a second threshold difference. The second threshold difference is greater than the first threshold difference. Similar to the first threshold difference, the second threshold difference may be a value predefined by the erratic driver detection system 14, a user-selectable value, or a value based on the lane markings of the roadway. When the electronic processor 40 determines that the difference between the target model and the expected model is greater than the second threshold difference, the method 60 proceeds to step 92 and the electronic processor 40 classifies the instance of abnormal driving as an instance of erratic driving. The electronic processor 40 may classify the instance of abnormal driving as an instance of erratic driving regardless of the number of previously logged instances of abnormal driving corresponding to the target neighboring vehicle. Referring to FIG. 6 for example, the electronic processor 40 may determine that the difference between the target model corresponding to the first neighboring vehicle 200 and the expected model is greater than the second threshold difference, based on the values sampled at discrete points.

At step 96, the electronic processor 40 classifies the abnormal driving of the target neighboring vehicle as erratic driving by setting a flag or otherwise logging the classification in the memory 44. After erratic driving is detected, the method 60 proceeds to step 96. At step 96, the electronic processor 40 controls the host vehicle 100 to perform a safety action. For example, the electronic processor 40 may communicate a specific safety action to be performed to the vehicle control systems 22 based on the model. The safety action may include providing a visual and/or audio indication to the user interface 20 in order to alert the driver of the host vehicle 10 that a neighboring vehicle is driving erratically. The user interface 20 indication may include a safety recommendation for the driver. For example, the user interface 20 may visually or audibly recommend the driver to slow down, speed up, switch lanes, or pull over in order to avoid the erratic driving scenario. In some instances, the safety action includes shortening driver hands-off time. For example, autonomous vehicles typically alert the driver when the driver's hands have been off the steering wheel for a set period of time. The safety action may include shortening the set period of time and alerting the driver to keep hands on the steering wheel. In some instances, the safety action may include preparing for driver reaction to the erratic driver scenario. For example, the electronic processor 40 may control the vehicle control systems 22 to pre-fill the host vehicle brakes in anticipation of the driver actuating the brakes of the host vehicle 10. In some instances, the safety action includes controlling the vehicle to brake, accelerate, shift from the center of the lane in a direction away from the erratic driving scenario, and/or change lanes in a direction away from the erratic driving scenario.

Each step in the method 60 is illustrated once each and in a particular order, however, the steps of the method 60 may be reordered and repeated as appropriate. For example, the electronic processor 40 may determine whether the difference between the target model and the expected model is greater than the second threshold difference (step 88) prior to determining if the difference between the target mode and the expected model is greater than the first threshold difference (step 76). Additionally, any operations in the method 60 may be performed in parallel with each other as appropriate and as desired.

The erratic driver detection method 60 is described above with reference to the electronic processor 40, however, the erratic driver detection method 60 may be implemented in the host vehicle 10 in any appropriate matter. In some instances, the erratic driver detection method 60 is implemented in a distributed manner such that each sensor used in the erratic driver detection system 14 may be configured to process neighboring vehicle location information in order to collectively build the expected or target driving behavior models. In some instances, a particular sensor is designated as a master sensor and is configured to build the driving behavior models and detect abnormal driving, obstacle avoidance, and erratic driving based on sensor information received from the plurality of sensors 16. It should be understood that in some instances a "sensor" includes both sensing components and processing components (for example, a microprocessor) and, as a consequence, the sensor processes raw information or data and generates determinations. In general, whenever the term sensor is used it should be understood that the sensor may include both sensing and processing components and may be configured to generate data in particular formats, determinations regarding sensed phenomena, or other processed outputs.

Thus, aspects herein provide systems and methods for erratic driver detection. Various features and advantages are set forth in the following claims.

What is claimed is:

1. An erratic driver detection system for a host vehicle, the system comprising:

a sensor configured to
measure a distance between the host vehicle and a first detected neighboring vehicle,
measure a distance between the host vehicle and a second detected neighboring vehicle that is in front of or behind the first detected neighboring vehicle, and
output sensor data; and
an electronic processor connected to the sensor and configured to
build a first target driving behavior model for the first detected neighboring vehicle based on the sensor data, the first target driving behavior model including past, present, and predicted trajectories of the first detected neighboring vehicle,
build a second target driving behavior model for the second detected neighboring vehicle based on the sensor data and based on the first target driving behavior model,
build an expected driving behavior model corresponding to expected neighboring vehicle driving behavior of the first detected neighboring vehicle and the second target driving behavior model for the second detected neighboring vehicle,
determine a difference between the first target driving behavior model and the expected driving behavior model,
identify an instance of abnormal driving with respect to the first detected neighboring vehicle when the difference between the first target driving behavior model and the expected driving behavior model is greater than a first threshold difference and less than a second threshold difference, identify an instance of erratic driving with respect to the first detected neighboring vehicle when the difference between the first target driving behavior model and the expected driving behavior model is greater than the second threshold difference, and
in response to identifying the instance of erratic driving, control the vehicle to perform a safety action.

2. The system of claim 1, wherein the electronic processor is further configured to
sample the expected driving behavior model and the first target driving behavior model at discrete points,
determine the differences between the sampled values at each discrete point, and
determine the difference between the first target driving behavior model and the expected driving behavior model based on the differences in sampled values.

3. The system of claim 1, wherein
the sensor is further configured to detect lane markings on a roadway, and
the electronic processor is further configured to build, for a lane that the first detected neighboring vehicle drives in, a plurality of expected driving behavior models based on the detected lane markings,
select, from the plurality of expected driving behavior models, a model that most closely corresponds to the first target driving behavior model, and
identify the instance of erratic driving with respect to the first detected neighboring vehicle in response to detecting that the difference between the first target driving behavior model and the selected model is greater than the second threshold difference.

4. The system of claim 1, wherein
the electronic processor is further configured to classify the instance of abnormal driving as erratic driving in response to determining that the first detected neighboring vehicle has exhibited at least a predetermined number of instances of abnormal driving.

5. The system of claim 1, further comprising
a user interface, wherein the safety action includes providing an indication to the user interface.

6. The system of claim 1, wherein
the safety action includes at least one selected from the group consisting of shortening driver hands-off time, shifting the host vehicle from a center of a lane, or pre-filling the host vehicle brakes.

7. The system of claim 1, wherein
the safety action includes at least one of controlling the host vehicle to brake, controlling the host vehicle to accelerate, or controlling the host vehicle to change lanes.

8. A method implemented in a host vehicle for detecting erratic driving on a roadway, the method comprising:
measuring, with a sensor, a distance between the host vehicle and a first detected neighboring vehicle;
measuring, with the sensor, a distance between the host vehicle and a second detected neighboring vehicle that is in front of or behind the first detected neighboring vehicle,
outputting sensor data to an electronic processor connected to the sensor;
building a first target driving behavior model corresponding to the first detected neighboring vehicle based on the sensor data, the first target driving behavior model including past, present, and predicted trajectories of the first detected neighboring vehicle;

building a second target driving behavior model corresponding to the second detected neighboring vehicle based on the sensor data and based on the first target driving behavior model;

building, with the electronic processor, an expected driving behavior model corresponding to expected neighboring vehicle driving behavior of the first detected neighboring vehicle and the second target driving behavior model for the second detected neighboring vehicle;

determining a difference between the first target driving behavior model and the expected driving behavior model;

identifying an instance of abnormal driving with respect to the first detected neighboring vehicle when the difference between the first target driving behavior model and the expected driving behavior model is greater than a first threshold difference and less than a second threshold difference;

identifying an instance of erratic driving with respect to the first detected neighboring vehicle when the difference between the first target driving behavior model and the expected driving behavior model is greater than the second threshold difference; and in response to identifying the instance of erratic driving, controlling the vehicle to perform a safety action.

9. The method of claim 8, further comprising
sampling the expected driving behavior model and the first target driving behavior model at discrete points,
determining the differences between the sampled values at each discrete point, and
determining the difference between the target driving behavior model and the expected driving behavior model based on the differences in sampled values.

10. The method of claim 8, further comprising
detecting, with the sensor, lane markings on the roadway, and
building, with the electronic processor, a plurality of expected driving behavior models based on the detected lane markings.

11. The method of claim 8, further comprising
classifying the instance of abnormal driving as erratic driving in response to determining that the first detected neighboring vehicle has exhibited at least a predetermined number of instances of abnormal driving.

12. The method of claim 8, wherein
the safety action includes providing an indication to a user interface.

13. The method of claim 8, wherein
the safety action includes at least one selected from the group consisting of shortening driver hands-off time, shifting the host vehicle from a center of a lane, or pre-filling the host vehicle brakes.

14. The method of claim 8, wherein
the safety action includes at least one of controlling the host vehicle to brake, controlling the host vehicle to accelerate, or controlling the host vehicle to change lanes.

15. A non-transitory computer-readable medium storing instructions that, when executed by an electronic processor in a host vehicle, cause the electronic processor to:

receive sensor data from a sensor configured to measure a distance between the host vehicle and a first detected neighboring vehicle, and measure a distance between the host vehicle and a second detected neighboring vehicle that is in front of or behind the first detected neighboring vehicle;

build an expected driving behavior model corresponding to expected neighboring vehicle driving behavior;

build a first target driving behavior model corresponding to the first detected neighboring vehicle based on the sensor data, the first target driving behavior model including past, present, and predicted trajectories of the first detected neighboring vehicle;

build a second target driving behavior model corresponding to the second detected neighboring vehicle based on the sensor data and based on the first target driving behavior model;

determine a difference between the first target driving behavior model and the expected driving behavior model;

determine a difference between the second target driving behavior model and the first target driving behavior model;

identify an instance of abnormal driving with respect to the first detected neighboring vehicle when the difference between the first target driving behavior model and the expected driving behavior model and the difference between the second target driving behavior model and the first target driving behavior model are greater than a first threshold difference and less than a second threshold difference;

identify an instance of erratic driving with respect to the first detected neighboring vehicle when the difference between the first target driving behavior model and the expected driving behavior model is greater than the second threshold difference; and in response to identifying the instance of erratic driving, control the vehicle to perform a safety action.

* * * * *